United States Patent [19]

Nemir

[11] 3,774,526
[45] Nov. 27, 1973

[54] NUT SHELLING MACHINE
[75] Inventor: Clarence T. Nemir, Kenwood, Md.
[73] Assignee: Carribean Cashew Company, Milwaukee, Wis.
[22] Filed: Apr. 27, 1971
[21] Appl. No.: 137,753

[52] U.S. Cl. .................................. 99/582, 99/577
[51] Int. Cl. ............................................ A23n 5/00
[58] Field of Search .................... 99/582, 581, 562, 99/577, 571

[56] References Cited
UNITED STATES PATENTS
| 353,143 | 11/1886 | Koerber | 99/581 |
| 2,284,879 | 6/1942 | Nemir | 99/577 |
| 2,472,354 | 6/1949 | Waters | 99/581 X |
| 3,439,719 | 4/1969 | Cardoso | 99/568 |
| 3,119,426 | 1/1964 | Anderson | 99/577 X |

FOREIGN PATENTS OR APPLICATIONS
| 14,963 | 0/1915 | Great Britain | 99/581 |

Primary Examiner—Andrew R. Juhasz
Assistant Examiner—Z. R. Bilinsky
Attorney—Birch & Birch

[57] ABSTRACT

A nut shelling machine is provided for the continuous and automated shelling of cashew nuts. The machine includes a shelling station with opposed interacting cutting blades, cutting guides and a shell splitter associated with one cutting blade, a nut orienting and delivery device for supplying cashew nuts to said shelling station in an eye-down position; and a nut transferring mechanism taking one nut at a time from the orienting and delivery device effecitvely rotating same 90° about the nut "eye" before placing it between the guides and blades in the shelling station. All of these elements of the shelling machine are driven in common synchronism from a common timing chain through suitable cams, gears and/or eccentrics.

20 Claims, 16 Drawing Figures

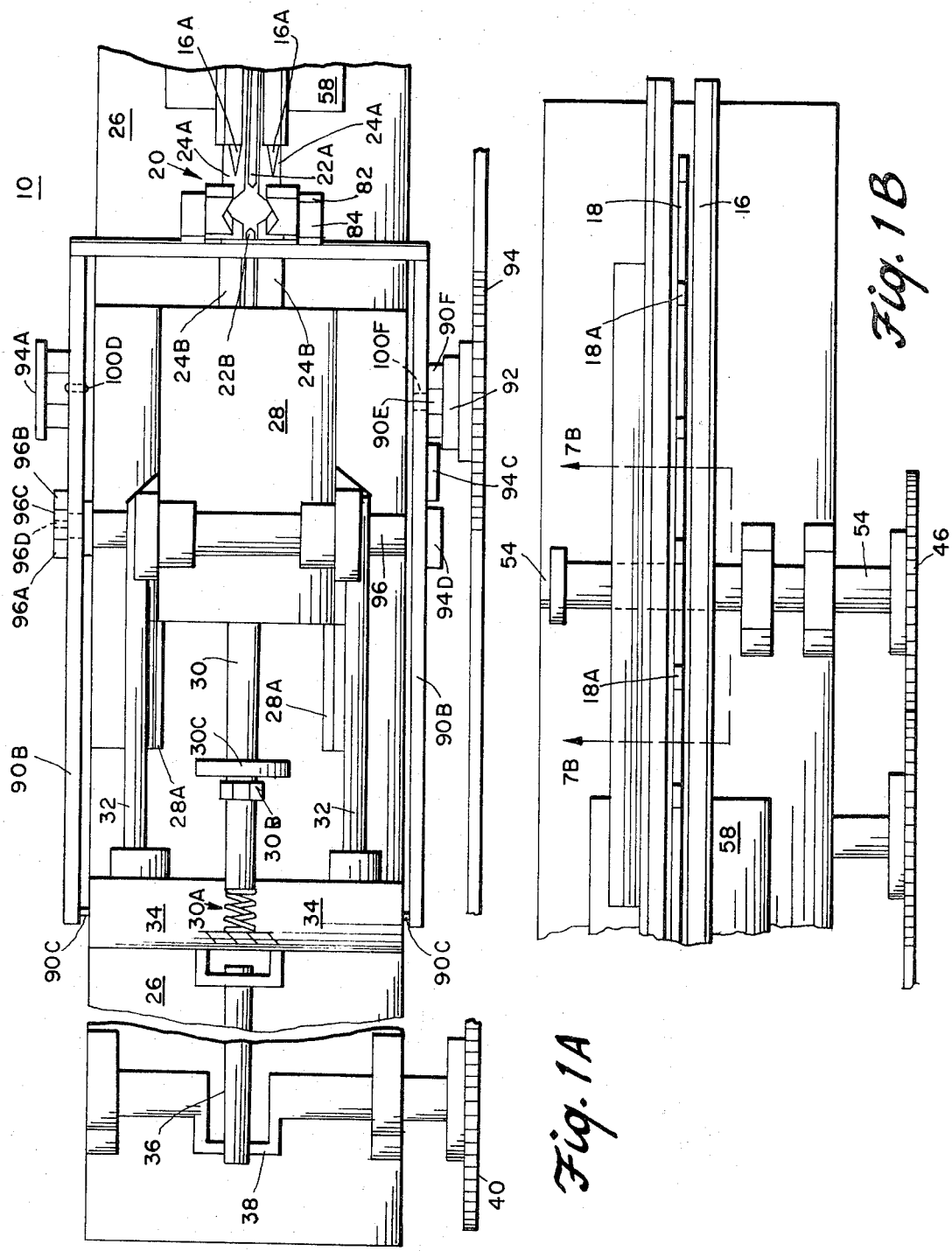

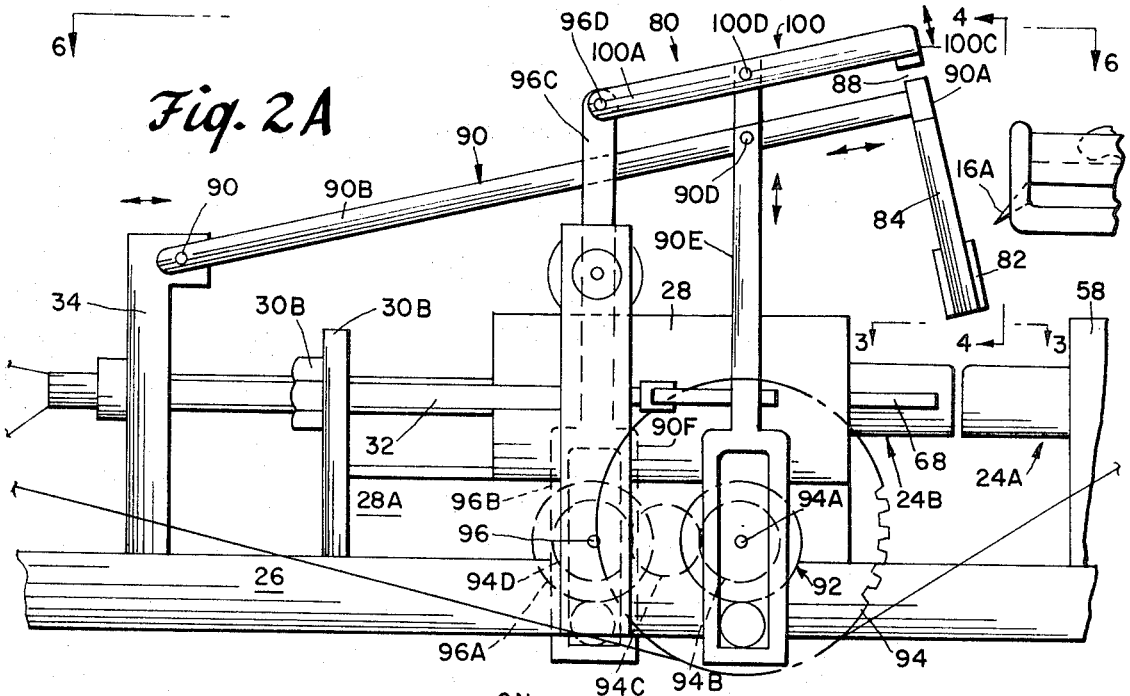
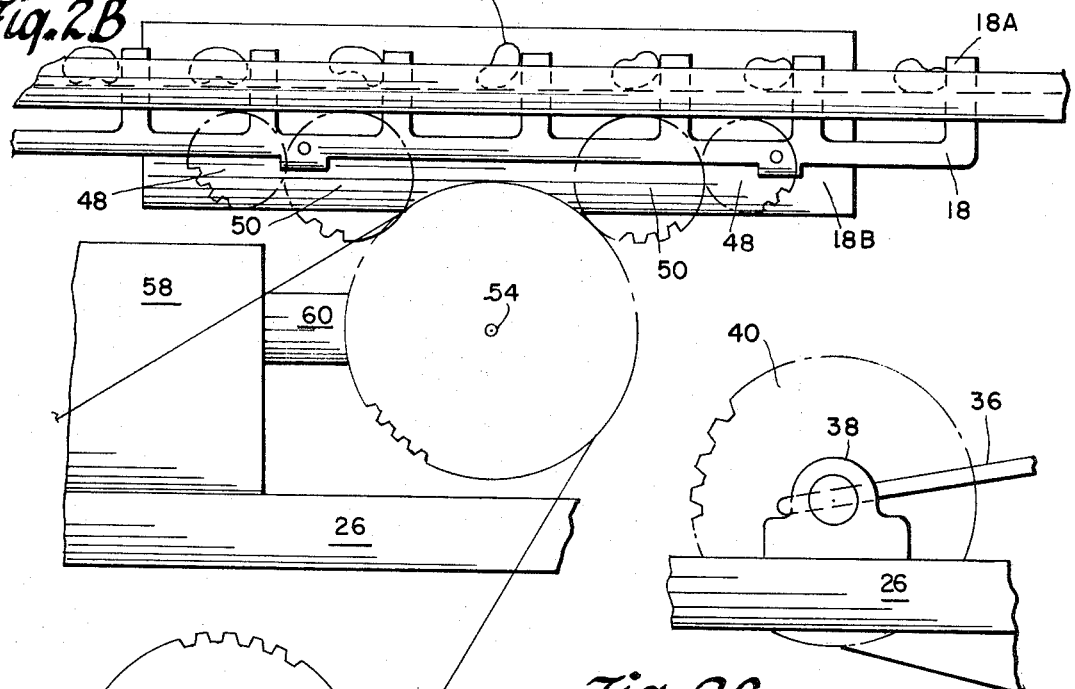

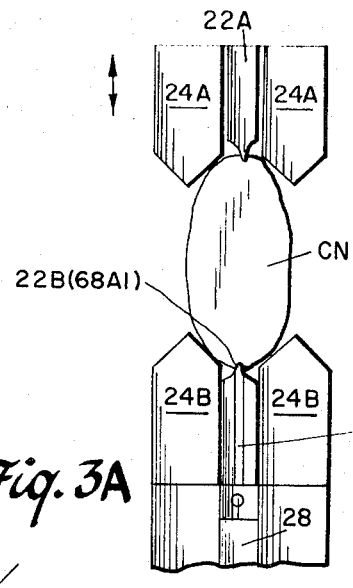
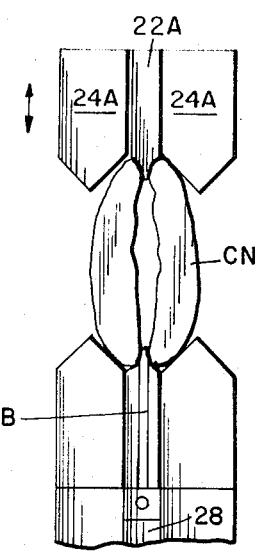
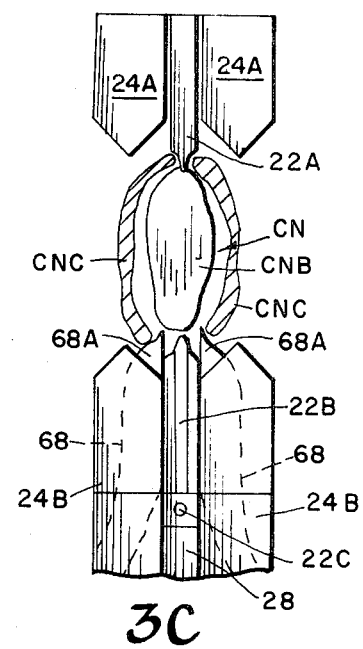
Fig. 3A
3B
3C
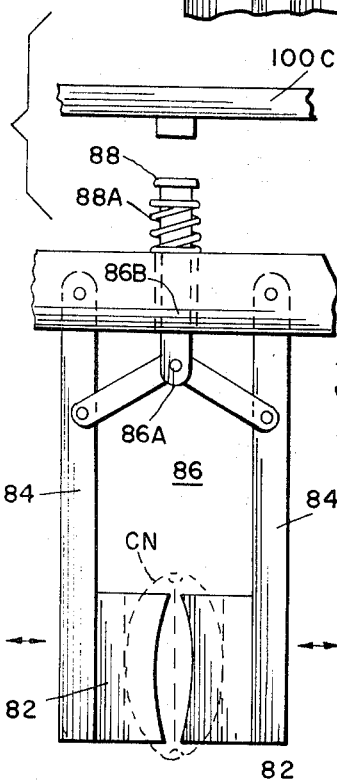
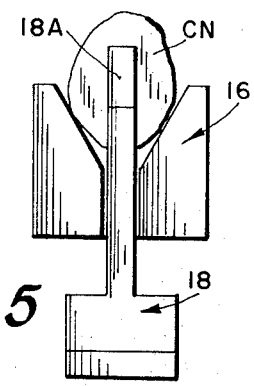
Fig. 5
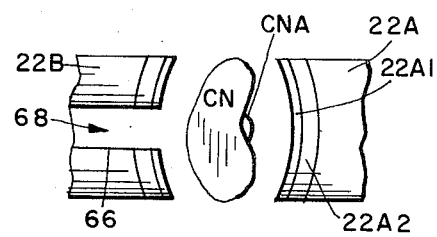
Fig. 3D
Fig. 4
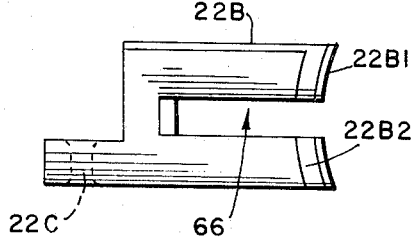
Fig. 6A
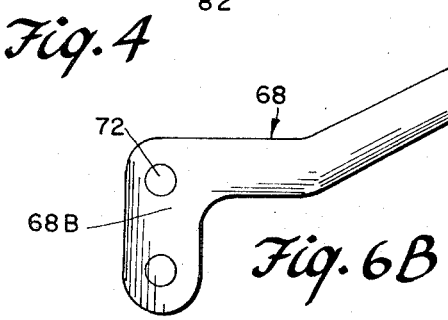
Fig. 6B
INVENTOR
CLARENCE T. NEMIR
BY Birch & Birch
ATTORNEY

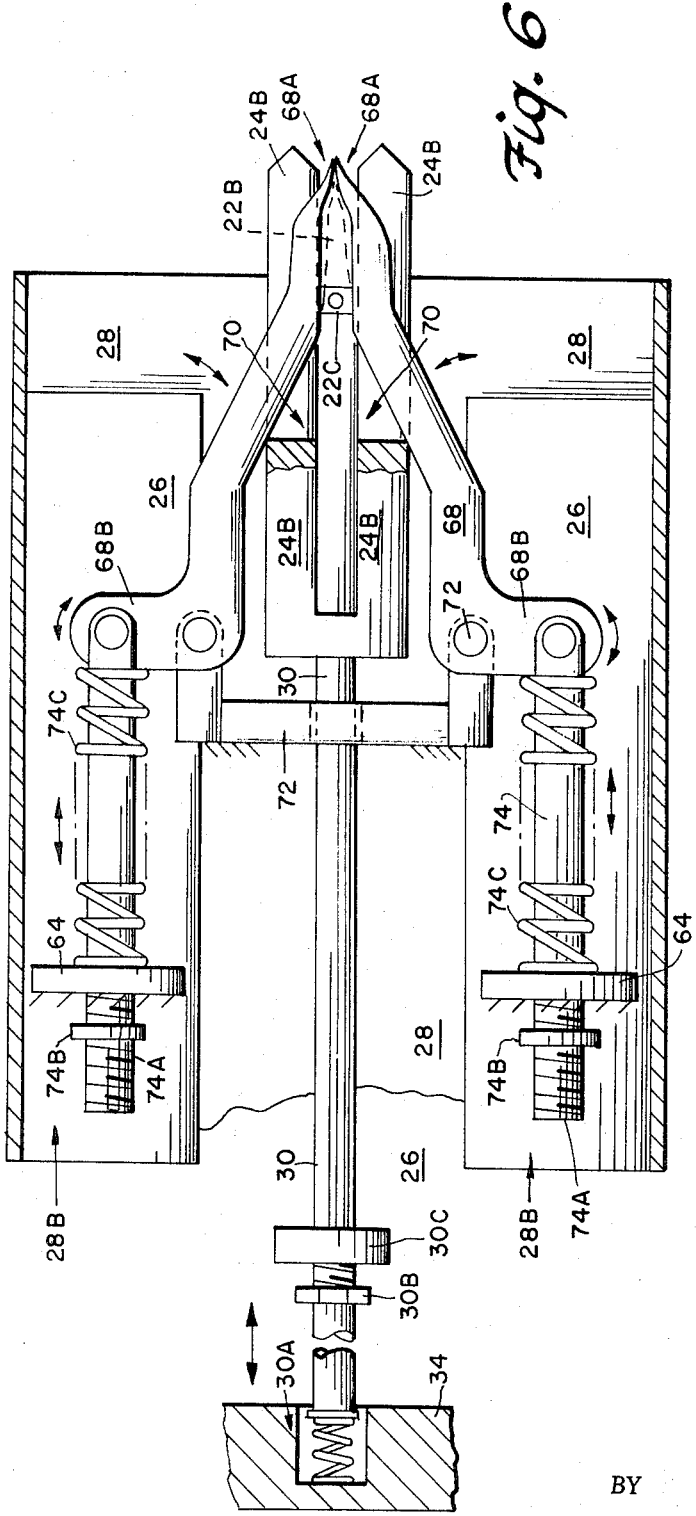
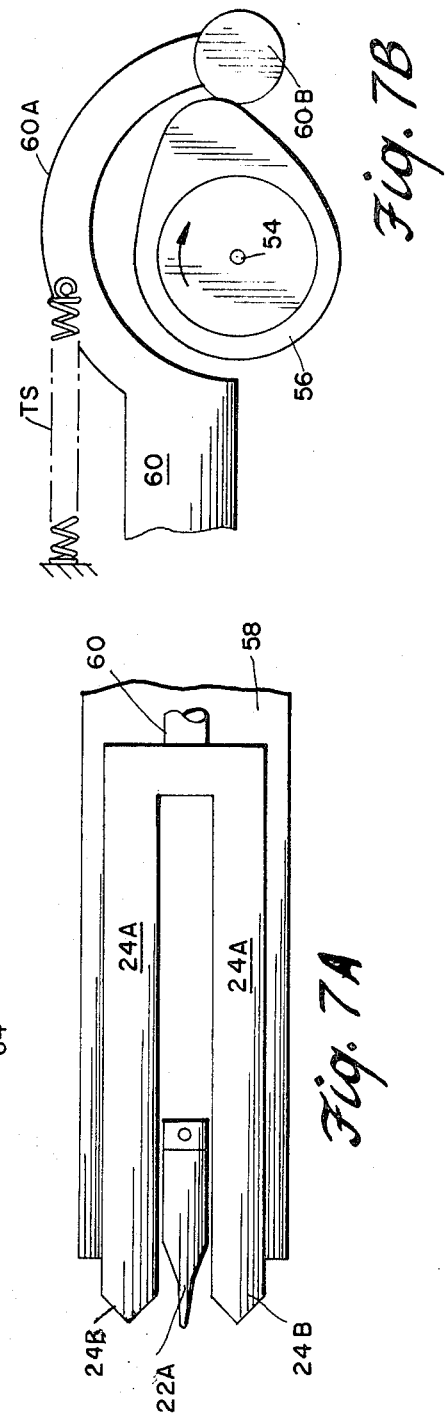
INVENTOR
CLARENCE T. NEMIR
BY Birch & Birch
ATTORNEY

NUT SHELLING MACHINE

This invention relates to nut shelling machines and more particularly to nut shelling machines capable of fully automated shelling of cashew nuts.

The full commercial value of cashew nuts and their by-products has not been fully achieved in the prior art because of a lack of fully automated shelling machinery. Furthermore, the present day shelling machinery, requires substantial manual monitoring and control, with the additional and critical requirement that cashew nuts processed therein have a pre-processed shelf life, preferably, of less than 24 hours.

This pre-processing conventionally comprises an oil bath for roasting the nuts in the shells and removing a relatively high percentage of CNSL (cashew nut shell liquid) from the shells. Both CNSL and the shells are valuable by-products of cashew nut processing.

The roasting process, followed by controlled drying renders the cashew nutmeats or kernels more brittle than in the raw state and presently known equipment cannot effect shelling of the cashew nuts unless a very short period of time elapses between drying and shelling, namely, 24 hours or less.

This requires that de-oiling (roasting) and shelling be accomplished at the same situs. To compound the problem, cashew nuts are grown in the lesser developed areas of the world and must be promptly pre-processed to preclude spoilage. Coupled with the short shelf-life of de-oiled nuts dictated by presently known shelling machinery, de-oiled nuts cannot be stockpiled, precluding performance of the shelling operation elsewhere.

Further, the shelled nuts must then be pealed or blanched, sorted, graded and shipped in bulk form in their most fragile state (shelled) to other parts of the world for consumption.

It is, therefore, an object of the present invention to provide new and novel cashew nut shelling machinery which is capable of fully automated shelling with an optimized yield of unbroken kernels.

Another object of the present invention to provide new and novel cashew nut shelling machinery which is capable of fully automated shelling of cashew nuts which have been de-oiled for a time period on the order of 1 year or more, with an optimized yield of unbroken kernels.

Still another object of the present invention is to provide a shelling machine for cashew nuts and the like having new and novel feeding, gripping and cutting mechanisms for effecting separation of the shells and kernels of the nuts.

These and other objects of the present invention will become more fully apparent with reference to the following specification and drawings which relate to a preferred embodiment of the invention.

IN THE DRAWINGS

FIGS. 1A and 1B together comprise a top plan view of the nut shelling machine of the present invention;

FIGS. 2A, 2B and 2C together comprise a side elevation of the nut shelling machine of the present invention;

FIGS. 3A, 3B and 3C are enlarged details taken on line 3—3 of FIG. 2A illustrating the sequence of shelling steps performed by the invention on a cashew nut;

FIG. 3D is a side elevation of the cutter blades and a cashew nut illustrating their relative orientation;

FIG. 4 is a front plan view of a nut gripping assembly taken on line 4—4 of FIG. 2A;

FIG. 5 is an enlarged end view of the nut orienting and transfer mechanism of FIGS. 1 and 2;

FIG. 6 is enlarged top plan view taken along line 6—6 of FIG. 2A, illustrating the moving shuttle, cutter blade and splitter mechanism of the present invention;

FIG. 6A is an enlarged detail of the moving cutter blade of the present invention;

FIG. 6B is a plan view illustrating one of the splitters of the present invention FIG. 7A is an enlarged top plan view of the fixed cutter blade and associated nut centering guides of the present invention; and FIG. 7B is an enlarged cross-section taken along line 7—7 of FIG. 1B, illustrating the actuating means for the nut centering guides of FIG. 7A.

Basically, the invention comprises an orientation input device which orients all of the incoming unshelled nuts in like orientation and feeds them one at a time into a pair of opposed, spring-loaded, centering guides which hold the nuts in a predetermined relative orientation to a pair of cutting dies, one moving and one fixed, mounted adjacent the guides.

The centering guides and cutting dies are relatively movable and timed by correlated linkages such that at the time the dies cut into the shell of the nut, the guides are withdrawn, leaving the shell and kernel free to separate.

The moving cutter die is provided with a pair of splitting fingers which enter the die cut in the shell and spring apart as the cutting action is completed, splitting the shell into substantially equal halves, which are flung aside by the action of these fingers and the kernel thereby separated from the shells.

The achievement of accurate centering, cutting and splitting of the shell is essential. Otherwise the irregular shape of the cashew nut will cause the kernel either to be cradled and held within a portion of the shell or to be fractured when the shell is rent asunder by the splitting fingers.

The cutting dies of the present invention are basically crescent shaped and have a two-stage cutting edge, a sharp cutting rim and a wide angle or braking portion which engage the shell in the order described.

Referring in detail to the drawings and with particular reference to FIGS. 1, 2 and 5, a shelling machine 10 of the present invention is shown as including a main nut reservoir or hopper 12, a secondary or input reservoir 14 fed thereby, and an input V-trough 16 connected with the input reservoir 14 to receive nuts therefrom into the machine 10.

The V-trough 16 is open at the bottom to receive the upstanding tines 18A of an oscillating fork mechanism 18 which operates on the cashew nuts CN entering the V-trough 16 to orient to said nuts CN with the "eye" thereof facing downward into the said V-trough and simultaneously advance the nuts CN to the inboard end of the V-trough.

The inboard end of the V-trough 16 terminates above the shelling station 20 which includes opposed cutter bars, said cutter bars comprising a fixed cutter bar 22A beneath the V-trough 16 and a moving cutter bar 22B.

The cutter bars 22A and 22B are each flanked by a pair of relatively movable cutter guides 24A and 24B, respectively. The interrelationship of the cutter bars 22A – 22B and cutter guides 24A – 24B will be hereinafter more fully described.

The machine 10 further includes a bed 26 upon which all of the components of the machine are suitably mounted in a conventional manner.

The moving cutter bar 22B and cutter guide pair 24B are mounted in and extend from one end of a block-shaped shuttle 28 which sits on a trackway 28A on the bed 26 and receives at its other end a driving shaft 30 for the guide pair 24B bar 22B and two driving shafts 32, one engaging each side of the shuttle 28.

The shafts 32 are fixed at their outer ends in a crosshead 34, the latter being driven in reciprocation along a portion of the bed 26 by means of a pair of crank arms 36 and a drive eccentric 38, the latter being powered by an input sprocket 40 mounted on one side of the bed 26 and driven by an endless timing chain 42 extending from a main input sprocket 44 mounted beneath the bed 26. The guide shaft 30 is mounted in a spring socket 30A in the crosshead 34 to permit a slight overtravel of the crosshead with respect to the guides 24B as will be fully described hereinafter.

A second input sprocket 46 is provided adjacent the V-trough 16 on the bed 26 and driven by the timing chain 42 to rpovide a synchronized input drive for the oscillating rake mechanism 18.

In this regard, the rake 18 has a pair of dependent ears 18B eccentrically pivoted one on each of a corresponding pair of drive gears 48, the latter being respectively driven through one of a pair of idler gears 50 having a neutral driving gear 52 mounted on a common timing shaft 54 with the second input sprocket 46 for rotation therewith.

The timing shaft 54 extends entirely across the bed 26 and in addition to the driving gear 52 for the rake 18 mounts a timing cam 56 for the cutter guide pair 24A (FIG. 7B), adjacent the fixed cutter bar 22A, the timing of which will be hereinafter more fully described.

Referring next to FIGS. 1, 2, 7A and 7B, the fixed cutter bar 22A is mounted in a fixed block or standard 58 in which its associated cutter guide pair 24A is slidably mounted.

A reciprocating follower shaft 60 is affixed to the rear portion of the cutter guide pair 24A and extends beneath the V-trough 16 and rake assembly 18 into proximity with the timing shaft 54 and timing cam 56 thereon. The follower shaft 60 carries a terminal yoke 60A with a cam follower 60B on the outermost end thereof, the latter being constrained to engage the timing cam 56 to effect timed reciprocation of the follower shaft 60 and cutter guide pair 24A via the timing chain 42, idler sprocket 46 and timing shaft 54, with the remaining components of the nut shelling machine 10.

A tension spring TS is connected between the follower yoke 60A and a fixed hold-down 62 such that the spring TS is disposed substantially parallel to the axis of reciprocation of the follower shaft 60. The spring TS, as will be described further, hereinafter, constrains the cutter guide pair 24A into resilient engagement with the cashew nuts CN during the shelling operation, as well as maintaining the follower roller 60B on the actuating surface of the cam 56.

The moving cutter bar 22B and its related elements will now be described in detail with reference to FIGS. 1, 2 and 6.

The shuttle 28 is hollow and fixedly mounts the moving cutter bar 22B on the leading extremity thereof by means of a set screw 22C and conventional keying or the like. The shuttle 28 is hollowed out to expose the machine bed 26 in a pair of axially disposed parallel troughs 28B, to provide clearance, during reciprocating movement of the shuttle 28 for a pair of upstanding shell splitter bosses 64, fixed to the machine bed 26.

Referring momentarily to FIGS. 6A and 6B the moving cutter bar 22B is shown as including a lateral center slot 66 for receiving the conformally shaped tips 68A of a pair of opposed shell splitters 68. The shell splitters 68 also extend through slots 70 in the cutter guide pair 24B, outboard thereof, to a respective pair of fixed pivots 72 fixed by bracket 72A to the shuttle 28.

At the fixed pivots 72, the shell splitters 68 are in the form of bell cranks 68B having their free ends pivotally coupled to respective indexing shafts 74 which extend through the respective fixed splitter bosses 64.

The indexing shafts 74 have threaded extremities 74A mounting stop-nuts 74B which are adapted to engage the bosses 64 after a predetermined movement of the shuttle 28 and moving cutter bar 22B toward the fixed cutter bar 22A under the influence of the crosshead 34.

Because of the bell crank configuration 68B of the shell splitters 68, compression springs 74C are mounted concentrically on the indexing shafts 74 in compressed abutment between the splitter bosses 64 and the splitter bell cranks 68B, thereby normally constraining the splitter tips 68A of the shell splitters 68 into the center slot 66 (FIG. 6A) of the moving cutter bar 22B.

In the operation of this sub-assembly, it is now clear that upon a predetermined movement of the shuttle 28 causing the adjustable stop nuts 74B to engage the splitter bosses 64, the indexing shafts 74 will cause the splitter bell cranks 68B to pivot toward the splitter bosses 64, compressing the springs 74C and causing the splitter tips 68A to move rapidly outward from the sides of the moving cutter bar 22B.

This rapidity of motion is due to the relatively long length of the splitter 68 when compared to the length of its bell crank 68B, thus creating an amplification of any slight movement of the bell crank 68B into a relatively large lateral movement of the splitter tips 68A.

Further, the guide pair 24B is held back away from the splitter tips 68A and tip of the moving cutter bar 22B by means of an adjustable stop nut 30B mounted on a threaded portion of the driving shaft 30, adjacent a cutter guide boss 30C on the bed 26. When sufficient forward travel has occurred in the shuttle 28 and crosshead 34 to juxtapose the moving cutter bar 22B and fixed cutter bar 22A with a cashew nut CN, the stop nut 30B engages the guide boss 30A, stopping the forward movement (to the right as shown in FIGS. 1, 2 and 6) of the guide pair 24B and shaft 30, whereupon the compression socket 30A permits the crosshead 34 to continue its advance of the shafts 32, shuttle 28 and moving cutter bar 22B in an amount sufficient to cut and split the shell of the cashew nut CN held between the cutter bars 22A, 22B and previously held in that position by the guide pairs 24A, 24B.

By means of the timing chain 42, the retraction of the cutter guide pair 24A with reference to the fixed cutter bar 22A is synchronized with the apparent retraction of the cutter guide pair 24B with reference to the moving cutter bar 22B and splitter tips 68A.

Referring now to FIGS. 1, 2 and 4, a nut transfer mechanism 80 is shown as including a pair of nut gripping jaws 82 mounted on respective ones of a pair of dependent actuating arms 84 joined together intermediate the ends thereof by a lazy tong linkage 86, the central pivot 86A of the latter being connected through a vertical push rod 86B to an actuating button 88.

The actuating arms 84 are pivoted at the upper ends thereof in the cross bar 90A of a traversing frame member 90, the latter including a pair of driving arms 90B extending from the cross bar 90A, above the shelling station 20, to side pivots 90C on the crosshead 34.

The actuating button 88 and vertical push rod 86B are biased upward, the gripping jaws 82 thus being biased closed through the lazy tong linkage 86 and actuating arms 84, by means of a compression spring 88A between the said button 88 and cross bar 90A about the push rod 86B.

The traversing frame 90 is supported intermediate its ends by a pivot 90D on a vertical follower rod 90E having a follower yoke 90F at its lower extremity cooperating with timed eccentric or traverse cam mechanism 92 mounted on the inboard side of a timed idler sprocket 94, the latter being driven by the timing chain 42.

The idler sprocket 94 drives a timing shaft 94A mounted transverse of the bed 26 beneath the shuttle 28.

On the timing shaft 94A is a timing gear 94B which drives an idler gear 94C, the latter driving a pinion gear 94D fixed on a timing shaft 96 which is mounted transversely on the bed 26 beneath the shuttle 28 and mounts, for rotation, a second timed transverse cam mechanism 96A on the opposite side of the bed 26 and shuttle 28 from the first traverse cam mechanism 92.

The second traverse cam mechanism 96A engages a second follower yoke 96B, which is integral with an upwardly extending second follower link 96 C, the latter being engaged at its upper extremity, through a pivot 96D with one end of a rocker arm 100A on a rocker frame 100.

The rocker frame 100 includes a second rocker arm 100B pivoted, parallel with the rocker arm 100A, both said rocker arms terminating in a cross bar 100C positioned above the cross bar 90A on the traverse frame 90.

The first rocker arm 100A is mounted on a pivot 100D intermediate its ends on a vertical standard 100E extending upward from one of the traverse frame arms 90B on the same side of the shuttle 28 as the second follower link 96C, substantially directly above the traverse cam shaft 94A.

The second rocker arm 100B extends only from the first follower link 90E to the cross bar 100C and is mounted to a vertical extension of the said first follower link 90E by a pivot 100F.

Centrally mounted on and dependent from the rocker frame cross bar 100C is an actuator foot 100G which is positioned directly above the actuator button 88 on the lazy tong linkage 86.

In operation, the nut gripping sub-assembly 80 is driven by the cross-head 34 via the drive links 90B in a direction toward the inboard end of the V-chute 16 such that the nut engaging heads 82 of the gripper 80 are positioned at the tips of a pair of nut delivery fingers 16A which slant downward at such an angle from the V-chute 16 as to position the cashew nuts CN, sliding out of the V-chute thereon, at such an angle that the said nuts CN will be positioned with the "eye" CNA thereof substantially in the plane of the actuator arms 84 of the nut gripper assembly 80. This position of the nut CN is best illustrated in FIG. 4 and will be hereinafter more fully described in connection with the shelling operation performed by the machine 10.

The upward throw of the traverse frame 90 is controlled by the first traverse cam mechanism 92 and the opening of the nut engaging heads 82 is timed by the second traverse cam mechanism 96A to coincide with two positions of the nut engaging heads 82. The first position is adjacent the delivery fingers 16A and the second position is between the cutter guide pairs 24A and 24B of the nut shelling station 20.

Because of the common timing chain 42, the rake 18, gripper 80 and shelling station 20 are all fully synchronized to deliver one nut CN to the shelling station 20 for each operating stroke of the shuttle 28, thereby effecting a shelling of the nut CN as will now be more fully described.

Referring first to FIG. 8, the fixed cutter bar 22A is shown as including a slightly beveled cutting edge 22A1 and a beveled splitting shoulder 22A2, subtending a wider angle than the cutting edge 22A1, for penetrating the shell of a nut CN in sequence.

As shown in FIG. 6A, a like cutting edge 22B1 and splitting shoulder 22B2 are provided on the moving cutter bar 22B.

Furthermore, as shown in FIG. 6B, each shell splitter in conformally shaped at 16A1 and 16A2 with the adjacent portions of the cutting edge 22B1 and splitting shoulder 22B2, respectively, of the moving cutter bar 22B, such that the splitter tips 16A can penetrate the shell of a nut CN in like manner to and simultaneously with the said moving cutter bar 22B.

THE SHELLING OPERATION

Referring now to FIGS. 1, 2, 3A, 3B, 3C, 3D and 6, it is first seen with reference to FIGS. 1 and 2 that as the nuts CN enter the rake mechanism 18 in the V-trough 16 from the input hoppers 13 and 14, the nuts CN are rotated and translated by the interaction of the rake fingers 18A and V-trough 16 such that the "eyes" CNA thereof are always faced downward into the V-trough 16 at the delivery fingers 16A where they are initially gripped between the gripping heads 82 of the nut gripping mechanism 80.

In synchronism with the elements of the machine 10, the gripping mechanism 80, by its traverse frame 90, transfers the gripped nut CN to a position between the cutter guides 24A, 24B, which, by the timing chain 42 and related components previously described are advanced into engagement with the nut CN to resiliently engage same against their respective spring bias and with the nut CN positioned as schematically shown in FIGS. 3A – 3D.

The shuttle 28 is advancing toward the cutting station 20 at this point in time and causes the cutting edges 22A1, 22B1 and 68A1 of the cutter bars 22A1, 22B1 and splitter 68, respectively, to penetrate the shell of the nut CN.

Substantially simultaneously with this engaging action of the cutter guides 24A, 24B, the gripping heads 82 are separated by the engagement of the actuator foot 100G and actuator button 88 and attendant action of the lazy tong linkage 86 to leave the nut CN solely under the influence of the cutter guides 24A – 24B cutter bars 22A – 22B and shell splitters 68.

The first traverse cam 92, in the meantime, has lifted the gripping mechanism 80 out of the shelling station area via the traverse frame 90.

The shuttle 28 continues to advance causing the cutter guides 24A to recede from the cutting edge 22A1 of the fixed cutter bar 22A against the pull-spring TS (FIG. 7) as well as under the initial influence of the timer cam 56 and follower 60B via the drag link 60, sequentially shown in FIGS. 3A and 3B.

Simultaneously, the same relative motion is achieved between the moving cutter bar 22B and its cutter guide pair 24B due to the resilient action of the spring socket 30A and ultimate stop action of the guide boss 30B and stop nut 30C via the cutter guide shaft 30, this sequence being illustrated in FIGS. 3A and 3B.

Further advance of the shuttle 28 and synchronized rotation of the timer cam 56 (FIG. 7), result in a withdrawal of the cutter guides 24A and 24B from the nut CN, leaving it instantaneously impaled upon the cutter bars 22A and 22B.

The shuttle 28 has nearly completed its stroke toward the cutting station 20 under the influence of the crosshead 34 and drive links 32. Its last increments of motion effect the following sequence of events:

1. The moving cutter bar 22B forces its cutting edge 22B1 and splitting shoulder 22B2 into the shell of the nut CN, causing a corresponding penetration of said shell by the cutting edge 22A1 and splitting shoulder 22A2 of the fixed cutter bar 22A.

2. The tips 68A of the shell splitters 68 are also simultaneously caused to fully penetrate the shell of the nut CN.

3. Over the last minute increment of travel of the shuttle 28 toward the shelling station 20, the splitter controlling stop nuts 74B engage the splitter bosses 64 and cause the splitter fingers 68 to surge outward on the bell cranks 68B. Therefore, the shell of the nut CN is rent asunder by the splitter tips 68A and the nutmeat CNB is freed.

4. The nutmeat CNB falls downward into the shelling station 20 onto any suitable collecting mechanism (not shown) and the split halves CNC of the nut CN are flung outboard of the machine bed 26.

5. The shuttle 28 then withdraws under the influence of the crosshead 34 and the next nut CN has already been extracted from the V-trough 18 by the gripper mechanism 80 to commence a shelling cycle of another nut CN. The cycle is thereafter continuously repeated.

GRADING THE NUTS FOR SIZE

In the preferred embodiment of the invention described herein, the cashew nuts CN are graded to a nominal size for a given run of the shelling machine 10.

Upon a change in nominal nut size, one merely has to change the size of the cutter bars 22A and 22B to effect a proper adapation of the machine 10 to that nut size.

ACCURACY OF NUT POSITIONING

It can be readily seen that each and every cashew nut CN is substantially identically positioned between the opposed cutter bars 22A, 22B to effect a high uniformity of cut, with the moving cutter bar 22B and splitters 68 engaging the cashew nut CN on the opposite side thereof from the "eye" CNA.

Because of the beveled shapes of the cutter guides 24A, 24B, the cashew nut CN are always centered on the cutter bars 22A, 22B, thereby precluding the oddly shaped nutmeat from being gripped in an uneven shell half CNC, which would cause the nutmeat CNA to shatter or crumble and destroy its prime market value.

Such accuracy of positioning and orientation of the nuts CN with the cutter bars 22A, 22B is critical to the success of the shelling operation.

Without the indexing and orientation effects of the rake 18, V-trough 16, gripping mechanism 80 and cutter guides 24A, 24B, the results of such an automated shelling process on cashew nuts would be impractical, unworkable and generally disastrous.

Futhermore, long periods of storage of treated cashew nuts, in the shell, heretofore unattainable because of the inability of prior art devices to shell such stored nuts, are now possible because of the precision shelling effected by the present invention.

Accordingly, it can be readily seen from the foregoing description and drawings that the present invention satisfies a long felt need in the art.

I claim:

1. In a nut shelling machine particularly adapted for shelling cashew nuts, a shelling station, comprising: first and second opposed cutter blades having substantially coplanar cutting edges; first and second pairs of spring loaded cutter guides flanking said first and second cutter blades, repectively, said guide pairs being resiliently biased toward one another and having a configuration effecting the centering of a nut received therebetween with respect to said cutter blades; and actuating means effecting a closing motion of said opposed cutter blades into engagement with a nut held between said guide pairs, a relative retraction of said guide pairs from said nut substantially immediately upon engagement of said nut by said cutter blades, and a piercing and splitting of the shell of said nut by said cutter blades, at least one of said cutter blades including comformably shaped splitter means, said splitter means piercing the shell of said nut as part of said cutter blade; and second actuating means constraining said splitter means to exert a splitting force internally of the shell of said nut directed transversely of the common plane of said cutting edges of said blades substantially immediately subsequent to said retraction of the associated pair of said cutter guides.

2. The invention defined in claim 1, wherein said shelling station further includes synchronizing means contraining said first and second actuating means to a predetermined and repetitive sequence of operation.

3. The invention defined in claim 1, wherein said shelling station further includes transfer and orientation means effecting the placement of a single nut between said cutter guides in a predetermined orientation substantially immediately prior to engagement thereof by said cutter guides.

4. The invention defined in claim 3, wherein said transfer and orientation means comprises trough means for receiving a series of nuts, one at a time, at one end thereof, from a source of supply; nut orienting and translating means in said trough means, extending the length thereof, exerting a turning to said nuts in said trough means and translating said nuts, one at a time to the other end of said trough means in synchronism with the operation of said shelling station; said trough means being so shaped and so proportioned as to entrap said nuts in predetermined orientation upon the achievement thereof by said nut orienting and translating means; and nut gripping means, in synchronism with said operation of said shelling station, removing one oriented nut at a time from one end of said trough means and transferring each said oriented nut to a position between said cutter guides.

5. The invention defined in claim 1, wherein said one of said cutter blades includes a crescent shaped cutting edge concaved to receive an unshelled nut thereagainst to effect a cut about a predetermined portion of the periphery of the nut shell, said one blade being relieved to form a slot through said cutting edge transversely of the span thereof; and said shell splitting means being mounted in said slot and displaceable transversely of said slot by said second actuating means.

6. The invention defined in claim 5, wherein said splitting means comprises first and second elongated fingers pivotally mounted on opposite sides of said cutter blade such that at least the tips thereof converge in said slot to form a portion of said cutting edge, said tips being so shaped and so proportioned as to conform to said cutting edge when said tips are juxtaposed in said slot.

7. The invention defined in claim 6, wherein said cutting edge comprises a leading relatively narrow shell cutting portion followed by a trailing substantially divergent wedge shaped shell splitting portion.

8. The invention defined in claim 5, wherein said cutting edge comprises a leading relatively narrow shell cutting portion followed by a trailing substantially divergent wedge shaped shell splitting portion.

9. The invention defined in claim 5, wherein both said cutter blades include cutting edges comprising a substantially crescent shaped cutting edge concaved to receive an unshelled nut there against to effect a cut about a predetermined portion of the periphery of the nut shell; said cutting edge comprising a leading relatively narrow shell cutting portion followed by a trailing substantially divergent wedge shaped shell splitting portion.

10. The invention defined in claim 1, wherein said guide pairs each comprise a pair of fingers immediately adjacent and flanking opposite sides of said cutter blades and spring biased to lead beyond said cutter blade into said shelling station, said fingers being relieved to form opposed guide planes converging on said cutter blade to center a nut engaging said guides on said cutter blade.

11. The invention defined in claim 1, wherein at least one of said cutter blades includes conformably shaped splitter means, said splitter means piercing the shell of said nut as part of said cutter blade; and second actuating means constraining said splitter means to exert a splitting force internally of the shell of said nut directed transversely of the common plane of said cutting edges of said blades substantially immediately subsequent to said retraction of the associated pair of said cutter guides; and wherein said guide pairs each comprise a pair of fingers immediately adjacent and flanking opposite sides of said cutter blades and spring biased to lead beyond said cutter blade into said shelling station, said fingers being relieved to form opposed guide planes converging on said cutter blade to center a nut engaging said guides on said cutter blade.

12. The invention defined in claim 11, wherein said shelling station further includes synchronizing means contraining said first and second actuating means to a predetermined and repetitive sequence of operation.

13. The invention defined in claim 11, wherein said shelling station further includes transfer and orientation means effecting the placement of a single nut between said cutter guides in a predetermined orientation substantially immediately prior to engagement thereof by said cutter guides.

14. The invention defined in claim 13, wherein said transfer and orientation means comprises trough means for receiving a series of nuts, one at a time, at one end thereof, from a source of supply; nut orienting and translating means in said trough means, extending the length thereof, exerting a turning to said nuts in said trough means and translating said nuts, one at a time, to the other end of said trough means in synchronism with the operation of said shelling station; said trough means being so shaped and so proportioned as to entrap said nuts in predetermined orientation upon the achievement thereof by said nut orienting and translating means; and nut gripping means, in synchronism with said operation of said shelling station, removing one oriented nut at a time from one end of said trough means and transferring each said oriented nut to a position between said cutter guides.

15. Cutting and splitting means for piercing and splitting the outer shell from cashew nuts and the like to free the nutmeat therein from the shell, comprising:

a cutter blade having a substantially crescent shaped cutting edge concaved to receive an unshelled nut thereagainst to effect a cut about a predetermined portion of the periphery of the nut shell;

said cutter blade being relieved to form a slot through said cutting edge transversely of the span thereof;

and shell splitting means mounted in said slot, said splitting means being comformally shaped to said cutting edge to act as a part thereof in piercing the shell of said nut and being displaceable, transversely of said slot, after piercing said shell, to internally apply an outwardly directed splitting force thereto.

16. The invention defined in claim 15, wherein said splitting means comprises first and second elongated fingers pivotally mounted on opposite sides of said cutter blade such that at least the tips thereof converge in said slot to form a portion of said cutting edge, said tips being so shaped and so proportioned as to conform to said cutting edge when said tips are juxtaposed in said slot.

17. The invention defined in claim 16, wherein said cutting edge comprises a leading relatively narrow shell cutting portion followed by a trailing substantially divergent wedge shaped shell splitting portion.

18. The invention defined in claim 15, wherein said cutting edge comprises a leading relatively narrow shell cutting portion followed by a trailing substantially divergent wedge shaped shell splitting portion.

19. The invention defined in claim 4, wherein said trough means comprises an elongated V-trough, apex down and truncated to form a slot, extending from said source of supply to said shelling station; and said transfer and said nut orienting and translating means comprises a rake mechanism having upstanding spaced tines mounted below and substantially coextensive with said V-trough, and drive means, in timed synchronism with said shelling station, effecting an upward motion into said trough and forward motion in said trough of said rake mechanism from said source of supply to said shelling station followed by a downward motion thereof out of said trough and a rearward motion beneath said trough in a repetitious cycle.

20. The invention defined in claim 14, wherein said trough means comprises an elongated V-trough, apex down and truncated to form a slot, extending from said source of supply to said shelling station; and said transfer and said nut orienting and translating means comprises a rake mechanism having upstanding spaced tines mounted below and substantially coextensive with said V-trough, and drive means, in timed synchronism with said shelling station, effecting an upward motion into said trough and forward motion in said trough of said rake mechanism from said source of supply to said shelling station followed by a downward motion thereof out of said trough and a rearward motion beneath said trough in a repetitious cycle.

* * * * *